US012608464B2

(12) United States Patent
An et al.

(10) Patent No.: US 12,608,464 B2
(45) Date of Patent: Apr. 21, 2026

(54) APPARATUS AND METHOD FOR INJECTING CONTROL FLOW INTEGRITY SECURITY CODE BASED ON LOCATION

(71) Applicant: ELECTRONICS AND TELECOMMUNICATIONS RESEARCH INSTITUTE, Daejeon (KR)

(72) Inventors: Gae-Il An, Daejeon (KR); Dong-Wook Kang, Daejeon (KR); Hong-Il Ju, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 405 days.

(21) Appl. No.: 18/349,450

(22) Filed: Jul. 10, 2023

(65) Prior Publication Data

US 2024/0160725 A1     May 16, 2024

(30) Foreign Application Priority Data

Nov. 14, 2022    (KR) ......................... 10-2022-0151297

(51) Int. Cl.
| | |
|---|---|
| *G06F 9/44* | (2018.01) |
| *G06F 8/41* | (2018.01) |
| *G06F 11/362* | (2025.01) |
| *G06F 21/54* | (2013.01) |
| *G06F 21/55* | (2013.01) |

(52) U.S. Cl.
CPC .............. *G06F 21/54* (2013.01); *G06F 8/433* (2013.01); *G06F 11/3644* (2013.01); *G06F 21/554* (2013.01)

(58) Field of Classification Search
CPC ...... G06F 8/433; G06F 11/3644; G06F 21/54; G06F 21/554
See application file for complete search history.

(56) References Cited

U.S. PATENT DOCUMENTS

| | | | | | |
|---|---|---|---|---|---|
| 8,583,939 | B2 * | 11/2013 | Lee | ......................... | G06F 21/54 |
| | | | | | 726/26 |
| 9,805,188 | B2 | 10/2017 | Wesie et al. | | |
| 2015/0135313 | A1 * | 5/2015 | Wesie | ..................... | G06F 21/51 |
| | | | | | 726/22 |
| 2015/0161383 | A1 * | 6/2015 | Chen | ....................... | G06F 21/53 |
| | | | | | 726/22 |

(Continued)

FOREIGN PATENT DOCUMENTS

| | | | |
|---|---|---|---|
| KR | 101256149 | B1 | 4/2013 |
| KR | 1020180039830 | A | 4/2018 |
| KR | 1020190092235 | A | 8/2019 |

OTHER PUBLICATIONS

Dean Sullivan et al., "Strategy Without Tactics: Policy-Agnostic Hardware-Enhanced Control-Flow Integrity", DAC '16: Proceedings of the 53rd Annual Design Automation Conference, Jun. 2016.

*Primary Examiner* — Qamrun Nahar
(74) *Attorney, Agent, or Firm* — Rabin & Berdo, P.C.

(57) ABSTRACT

Disclosed herein are an apparatus and method for injecting control flow integrity security code based on a location. The apparatus identifies an indirect function call in input program code, generates indirect function call location information by analyzing the identified indirect function call, and injects control flow integrity security code into the program code using the generated indirect function call location information.

12 Claims, 6 Drawing Sheets

(56) References Cited

U.S. PATENT DOCUMENTS

| | | | |
|---|---|---|---|
| 2017/0153908 A1* | 6/2017 | Han | .......................... G06F 21/53 |
| 2018/0144129 A1 | 5/2018 | Bailly et al. | |
| 2019/0163910 A1 | 5/2019 | Moon et al. | |
| 2021/0173921 A1* | 6/2021 | Lotspeich | ............... G06F 21/54 |

* cited by examiner

100

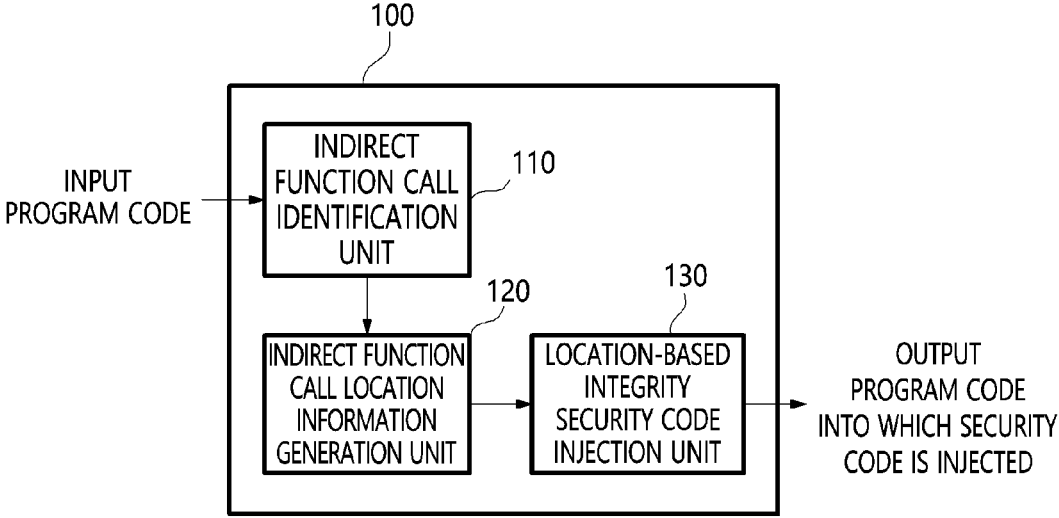

INPUT
PROGRAM CODE

INDIRECT
FUNCTION CALL
IDENTIFICATION
UNIT

110

120

INDIRECT FUNCTION
CALL LOCATION
INFORMATION
GENERATION UNIT

130

LOCATION-BASED
INTEGRITY
SECURITY CODE
INJECTION UNIT

OUTPUT
PROGRAM CODE
INTO WHICH SECURITY
CODE IS INJECTED

FIG. 1

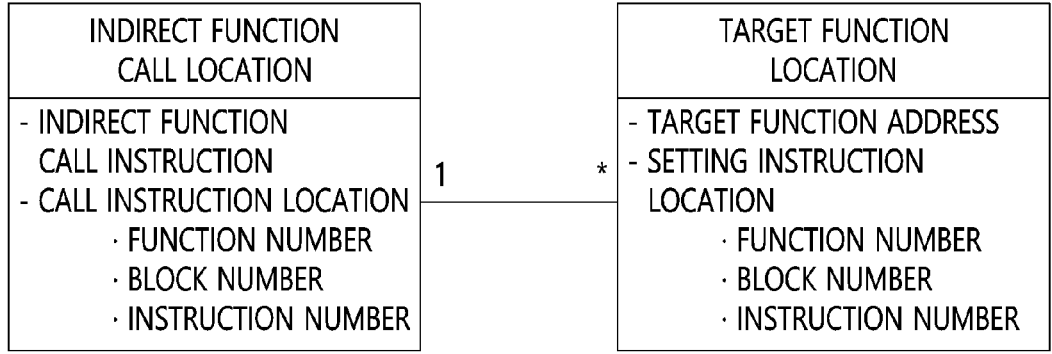

INDIRECT FUNCTION
CALL LOCATION

- INDIRECT FUNCTION
  CALL INSTRUCTION
- CALL INSTRUCTION LOCATION
  · FUNCTION NUMBER
  · BLOCK NUMBER
  · INSTRUCTION NUMBER

1

*

TARGET FUNCTION
LOCATION

- TARGET FUNCTION ADDRESS
- SETTING INSTRUCTION
  LOCATION
  · FUNCTION NUMBER
  · BLOCK NUMBER
  · INSTRUCTION NUMBER

FORM S210

IDENTIFY INDIRECT FUNCTION CALL INSTRUCTION — S310

CALCULATE LOCATION OF INDIRECT FUNCTION CALL INSTRUCTION — S320

IDENTIFY TARGET FUNCTION — S330

IS IT FOUND? — S340

NO

YES

IDENTIFY TARGET FUNCTION SETTING INSTRUCTION — S350

CALCULATE LOCATION OF TARGET FUNCTION SETTING INSTRUCTION — S360

STORE LOCATION INFORMATION — S370

TO S230

S230

APPARATUS AND METHOD FOR INJECTING CONTROL FLOW INTEGRITY SECURITY CODE BASED ON LOCATION

CROSS REFERENCE TO RELATED APPLICATION

This application claims the benefit of Korean Patent Application No. 10-2022-0151297, filed Nov. 14, 2022, which is hereby incorporated by reference in its entirety into this application.

BACKGROUND OF THE INVENTION

1. Technical Field

The present disclosure relates to computer software security technology capable of detecting and defending against a control-flow hijacking attack capable of executing code desired by an attacker by changing the flow of a computer program.

2. Description of the Related Art

A method of calling a function in a computer program is categorized into a direct call method in which the address of the function to be called is set at compile time and an indirect call method in which the address is set at runtime.

In the indirect call method, there is a risk that the address of the function to be called can be maliciously manipulated by an attacker because the address of the function to be called is stored in a variable in a data area. The attacker may perform a control-flow hijacking attack, which executes code desired by the attacker by exploiting the security vulnerability of the indirect call method.

As conventional Control Flow Integrity (CFI) security technology for defending against a control-flow hijacking attack, there are software-based defense techniques (e.g., uCFI, CFI-LB, and the like) and hardware-based defense techniques (e.g., ARM BTI, Intel CET, SWT, and the like).

The software-based techniques have high detection accuracy, but have a problem in which a large additional overhead is imposed due to a Call Function Graph (CFG) or Dynamic Binary Instrumentation (DBI) for analyzing the control flow of a program. The hardware-based techniques have no additional overhead, but have the disadvantage of low detection accuracy.

The conventional hardware-based techniques for defending against a control-flow hijacking attack allow all functions within program code to be indirectly called in order to inject specific security code, whereby attack detection accuracy may be decreased.

The conventional techniques are capable of defending against a control-flow hijacking attack but have problems in terms of detection accuracy and performance overhead, so a method for effectively solving these problems is required.

Meanwhile, U.S. Pat. No. 9,805,188, titled "Control flow integrity system and method" discloses an apparatus and method for checking control flow integrity by inserting two tags into a program in order to defend from hijacking of computer software.

SUMMARY OF THE INVENTION

An object of the present disclosure is to improve the accuracy of detection of a control-flow hijacking attack on an indirect function call and to reduce performance overhead.

In order to accomplish the above object, an apparatus for injecting control flow integrity security code based on a location according to an embodiment of the present disclosure includes one or more processors and executable memory for storing at least one program executed by the one or more processors. The at least one program identifies an indirect function call in input program code, generates indirect function call location information by analyzing the identified indirect function call, and injects control flow integrity security code into the program code using the generated indirect function call location information.

Here, the at least one program may identify an indirect function call instruction and a target function of the indirect function call instruction by analyzing the identified indirect function call and identify a target function setting instruction based on the target function.

Here, the at least one program may calculate block locations of the indirect function call instruction and the target function setting instruction in the program code.

Here, the at least one program may determine a control flow integrity identifier and a block location for injecting control flow integrity setting security code based on whether the block locations of the indirect function call instruction and the target function setting instruction are identical to each other in the program code.

Here, the at least one program may inject the control flow integrity setting security code at a block location of the indirect function call using a preset control flow integrity identifier when the block locations of the indirect function call instruction and the target function setting instruction are identical to each other in the program code.

Here, the at least one program may generate a new control flow integrity identifier and inject the control flow integrity setting security code at the block location of the target function setting instruction using the new control flow integrity identifier when the block locations of the indirect function call instruction and the target function setting instruction differ from each other in the program code based on the indirect function call instruction and the target function setting instruction.

Here, the at least one program may inject control flow integrity check security code at a block location of the target function.

Also, in order to accomplish the above object, a method for injecting control flow integrity security code based on a location, performed by an apparatus for injecting control flow integrity security code based on a location, according to an embodiment of the present disclosure includes identifying an indirect function call in input program code, generating indirect function call location information by analyzing the identified indirect function call, and injecting control flow integrity security code into the program code using the generated indirect function call location information.

Here, generating the indirect function call location information may comprise identifying an indirect function call instruction and a target function of the indirect function call instruction by analyzing the identified indirect function call; and identifying a target function setting instruction based on the target function.

Here, generating the indirect function call location information may comprise calculating block locations of the indirect function call instruction and the target function setting instruction in the program code based on the indirect function call instruction and the target function setting instruction.

Here, injecting the control flow integrity security code may comprise determining a control flow integrity identifier and a block location for injecting control flow integrity setting security code based on whether the block locations of the indirect function call instruction and the target function setting instruction are identical to each other in the program code.

Here, injecting the control flow integrity security code may comprise injecting the control flow integrity setting security code at a block location of the indirect function call using a preset control flow integrity identifier when the block locations of the indirect function call instruction and the target function setting instruction are identical to each other in the program code.

Here, injecting the control flow integrity security code may comprise generating a new control flow integrity identifier and injecting the control flow integrity setting security code at the block location of the target function setting instruction using the new control flow integrity identifier when the block locations of the indirect function call instruction and the target function setting instruction differ from each other in the program code.

Here, injecting the control flow integrity security code may comprise injecting control flow integrity check security code at a block location of the target function.

BRIEF DESCRIPTION OF THE DRAWINGS

The above and other objects, features, and advantages of the present disclosure will be more clearly understood from the following detailed description taken in conjunction with the accompanying drawings, in which:

FIG. 1 is a block diagram illustrating an apparatus for injecting control flow integrity security code based on a location according to an embodiment of the present disclosure;

FIG. 2 is a view illustrating a data structure of indirect function call location information according to an embodiment of the present disclosure;

DESCRIPTION OF THE PREFERRED EMBODIMENTS

Figure 3:
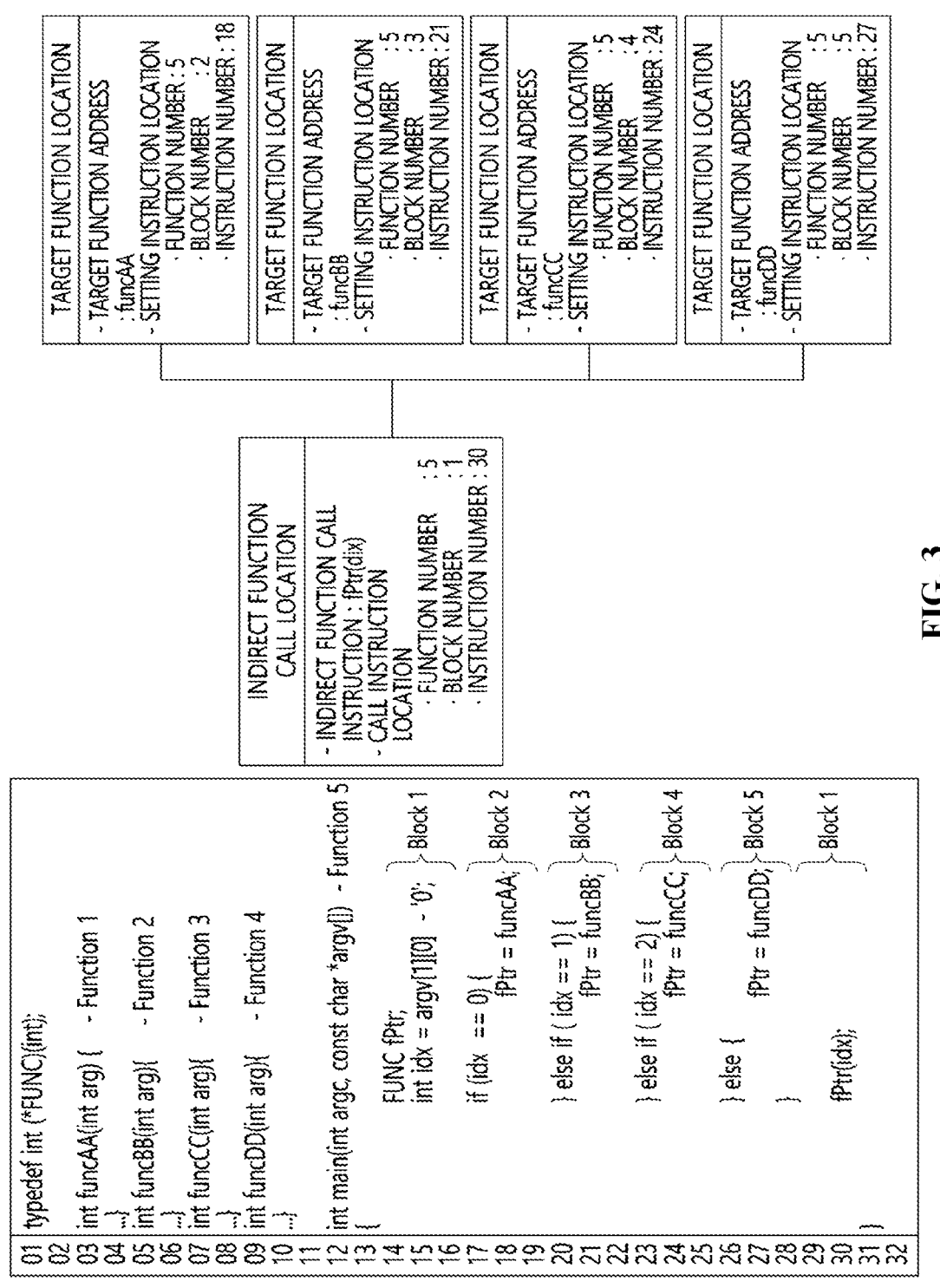
FIG. 3 is a view illustrating the configuration of an indirect function call location information database according to an embodiment of the present disclosure.

The present disclosure will be described in detail below with reference to the accompanying drawings. Repeated descriptions and descriptions of known functions and configurations which have been deemed to unnecessarily obscure the gist of the present disclosure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present disclosure will be described in detail with reference to the accompanying drawings.

Because the present disclosure is a hardware-based technique, it does not impose an additional overhead for CFG or DBI. Also, because control flow integrity security code is injected in consideration of the locations of an indirect function call and a target function setting instruction, the number of candidate functions capable of being indirectly called is small.

Accordingly, the present disclosure has reduced performance overhead compared to conventional technology, and may provide high attack-detection accuracy.

FIG. 1 is a block diagram illustrating an apparatus for injecting control flow integrity security code based on a location according to an embodiment of the present disclosure.

Referring to FIG. 1, the apparatus 100 for injecting control flow integrity security code based on a location according to an embodiment of the present disclosure includes an indirect function call identification unit 110, an indirect function call location information generation unit 120, and a location-based integrity security code injection unit 130.

The indirect function call identification unit 110 may receive program code and identify an indirect function call in the received program code.

The indirect function call location information generation unit 120 may generate indirect function call location information by analyzing the identified indirect function call.

Here, the indirect function call location information generation unit 120 may identify an indirect function call instruction and a target function of the indirect function call instruction by analyzing the identified indirect function call, and may identify a target function setting instruction based on the target function.

Here, the target function may correspond to a function that can be legitimately called by the indirect function call.

Here, the indirect function call location information generation unit 120 may calculate the block locations of the indirect function call instruction and the target function setting instruction in the program code based on the indirect function call instruction and the target function setting instruction.

Here, the indirect function call location information generation unit 120 may store the block location of the indirect function call instruction and the block location of the target function setting instruction in an indirect function call database.

The location-based integrity security code injection unit 130 may inject control flow integrity security code into the program code using the generated indirect function call location information.

Here, the location-based integrity security code injection unit 130 may retrieve the indirect function call location information from the indirect function call database.

Here, the location-based integrity security code injection unit 130 may read the block location of the indirect function call instruction and the block location of the target function setting instruction after opening the retrieved indirect function call location information.

Here, the location-based integrity security code injection unit 130 may determine a control flow integrity identifier and a block location for injecting control flow integrity setting security code based on whether the block locations of the indirect function call instruction and the target function setting instruction are the same as each other in the program code.

Here, the location-based integrity security code injection unit 130 may inject the control flow integrity setting security code at the block location of the indirect function call using a default Control Flow Integrity (CFI) identifier, which is a preset control flow integrity identifier, when the block locations of the indirect function call instruction and the target function setting instruction are the same as each other in the program code.

Here, the location-based integrity security code injection unit 130 may generate a new CFI identifier and inject the control flow integrity setting security code at the block location of the target function setting instruction using the new CFI identifier when the block locations of the indirect function call instruction and the target function setting instruction differ from each other in the program code.

Here, the location-based integrity security code injection unit 130 may inject control flow integrity check security code at the block location of the target function.

FIG. 2 is a view illustrating the data structure of indirect function call location information according to an embodiment of the present disclosure.

Referring to FIG. 2, indirect function call location information may include indirect function call location data and target function location data.

Here, the indirect function call location data may include an indirect function call instruction and a call instruction location.

Here, the call instruction location of the indirect function call location data may include a function number, a block number, and an instruction number.

Also, the target function location data may include a target function address and a setting instruction location.

Here, the location of the instruction setting the target function may include a function number, a block number, and an instruction number.

FIG. 3 is a view illustrating the configuration of an indirect function call location information database according to an embodiment of the present disclosure.

Referring to FIG. 3, it can be seen that program code and indirect function call location information stored in an indirect function call location information database according to an embodiment of the present disclosure are illustrated.

According to indirect function call location information, it can be seen that an indirect function call instruction is fPtr(idx) in the program code stored in the indirect function call location information database, and it can be seen that target function addresses, which are the locations of the target functions, are stored as funcAA, funcBB, funcCC, and funcDD.

Here, it can be seen that the block locations (2, 3, 4, and 5) of all of the target function setting instructions differ from the block location (1) of the indirect function call instruction.

Here, the block locations of the respective target function setting instructions (at lines 18, 21, 24, and 27 in the program code) may have different identifier values.

Accordingly, the present disclosure may inject control flow integrity setting security code at the block location of the target function setting instruction of the program code.

That is, because the present disclosure allows only one function to be indirectly called depending on the value of the variable 'idx' in the program code, it has higher attack detection accuracy than conventional technology in which four functions (that is, funcAA, funcBB, funcCC, and funcDD) are allowed to be called.

Figure 4:
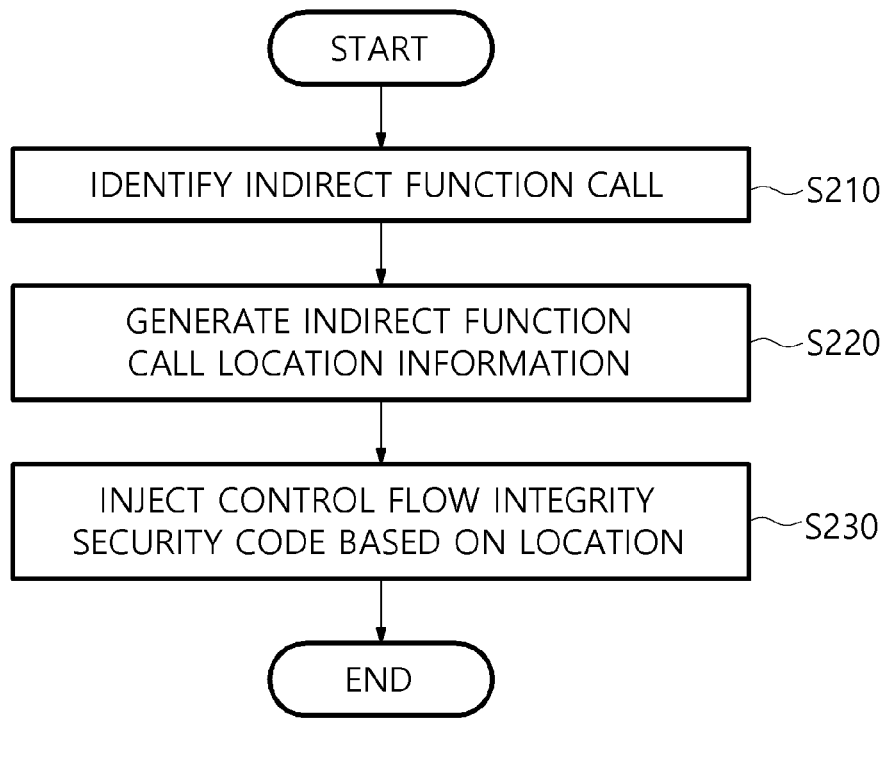
FIG. 4 is a flowchart illustrating a method for injecting control flow integrity security code based on a location according to an embodiment of the present disclosure.
Figure 5:
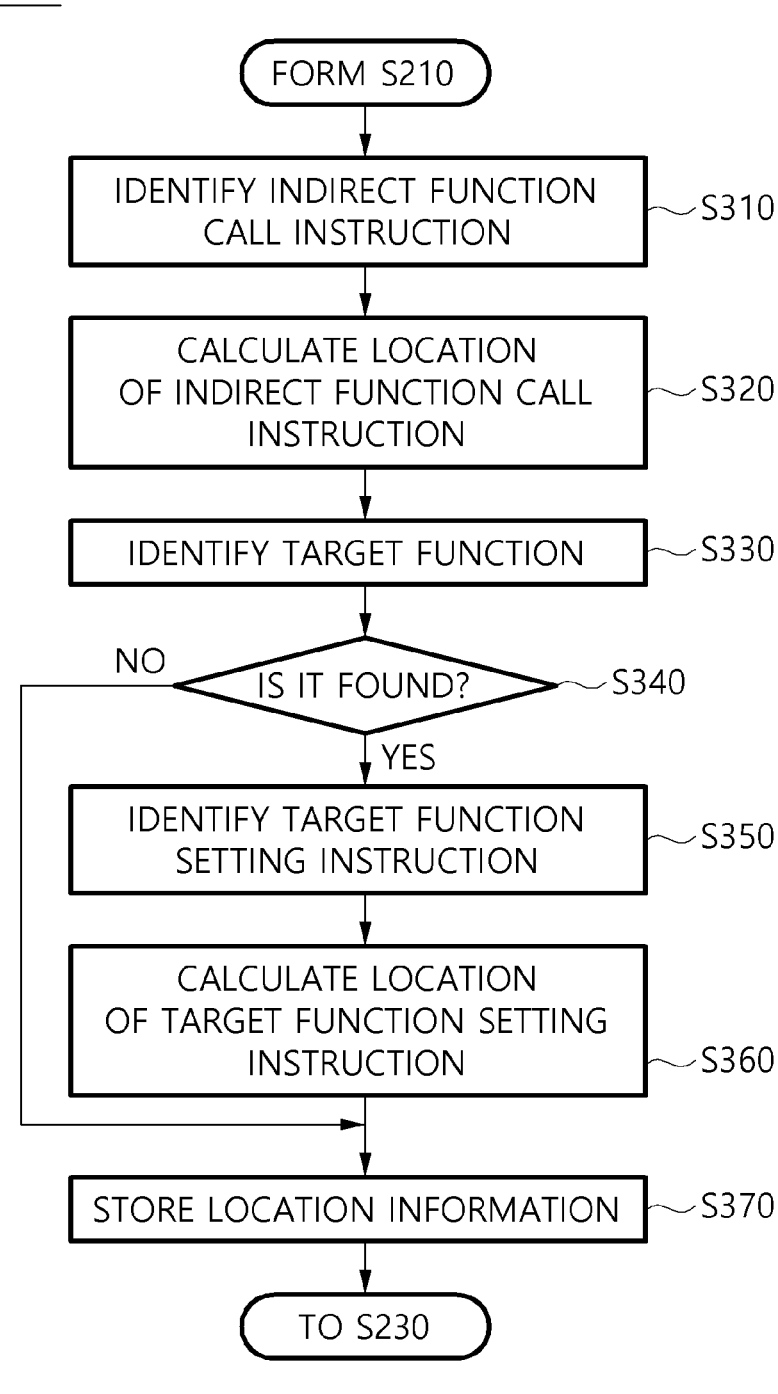
FIG. 5 is a flowchart illustrating in detail an example of the step of generating indirect function call location information illustrated in FIG. 4.
Figure 6:
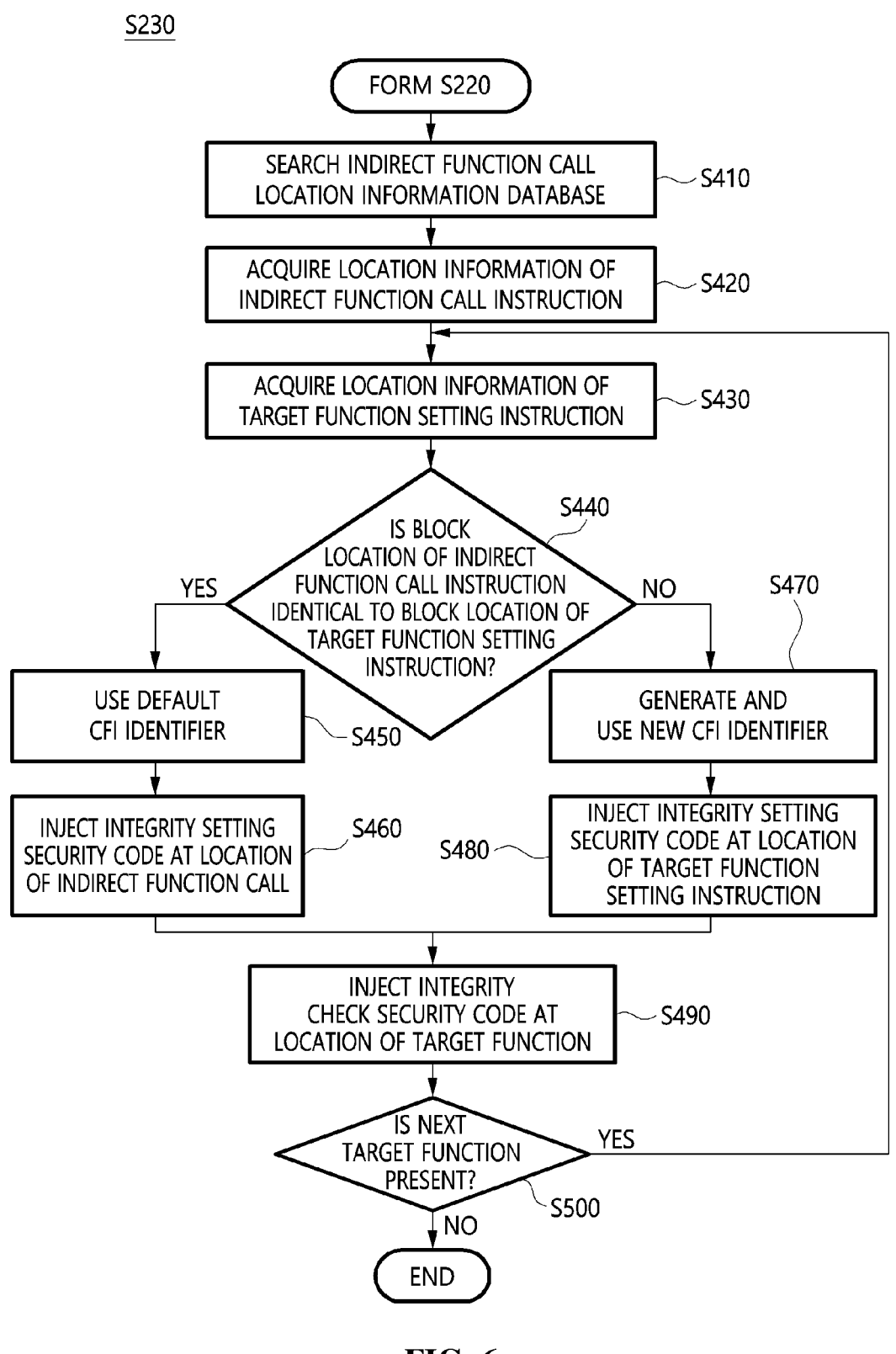
FIG. 6 is a flowchart illustrating in detail an example of the step of injecting control flow integrity security code based on a location illustrated in FIG. 4.

FIG. 4 is a flowchart illustrating a method for injecting control flow integrity security code based on a location according to an embodiment of the present disclosure. FIG. 5 is a flowchart illustrating in detail an example of the step of generating indirect function call location information illustrated in FIG. 4. FIG. 6 is a flowchart illustrating in detail an example of the step of injecting control flow integrity security code based on a location illustrated in FIG. 4.

Referring to FIG. 4, in the method for injecting control flow integrity security code based on a location according to an embodiment of the present disclosure, first, an indirect call function may be identified at step S210.

That is, at step S210, program code may be input, and an indirect function call may be identified in the input program code.

Also, in the method for injecting control flow integrity security code based on a location according to an embodiment of the present disclosure, indirect function call location information may be generated at step S220.

That is, at step S220, an indirect function call location information generation unit 120 may generate indirect function call location information by analyzing the identified indirect function call.

Referring to FIG. 5, an indirect function call instruction may be identified by analyzing the identified indirect function call at step S310.

At step S320, the block location of the indirect function call instruction may be calculated based on the identified indirect function call instruction.

At step S330, a target function may be identified by analyzing the identified indirect function call.

Here, the target function may correspond to a function that can be legitimately called by the indirect function call.

When the target function is identified based on the indirect function call at step S340, a target function setting instruction may be identified based on the target function at step S350.

At step S360, the block location of the target function setting instruction may be calculated based on the identified target function setting instruction.

At step S370, the block location of the indirect function call instruction and the block location of the target function setting instruction may be stored in an indirect function call database.

Also, in the method for injecting control flow integrity security code based on a location according to an embodiment of the present disclosure, control flow integrity security code may be injected based on a location at step S230.

That is, at step S230, the control flow integrity security code may be injected into the program code using the generated indirect function call location information.

Referring to FIG. 6, indirect function call location information may be retrieved from the indirect function call database at step S410.

At step S420, the block location of the indirect function call instruction may be acquired from the retrieved indirect function call location information.

At step S430, the block location of the target function setting instruction may be acquired from the retrieved indirect function call location information.

At step S440, a control flow integrity identifier and a block location for injecting control flow integrity setting security code may be determined based on whether the block locations of the indirect function call instruction and the target function setting instruction are the same as each other in the program code.

At step S450, a location-based integrity security code injection unit 130 may decide on a default Control Flow Integrity (CFI) identifier, which is a preset control flow integrity identifier, when the block locations of the indirect function call instruction and the target function setting instruction are the same as each other in the program code.

At step S460, the control flow integrity setting security code may be injected at the block location of the indirect function call using the preset control flow integrity identifier.

At step S470, a new control flow integrity (CFI) identifier may be generated when the block locations of the indirect function call instruction and the target function setting instruction differ from each other in the program code.

At step S480, the control flow integrity setting security code may be injected at the block location of the target function setting instruction using the new control flow integrity identifier.

At step S490, control flow integrity check security code may be injected at the block location of the target function.

At step S500, because the indirect function call location information may include multiple target functions, when the next target function is present, the process may go back to step S430.

Here, at step S430, the block location of the target function setting instruction of the next target function is acquired, and steps S440 to S490 may be repeated.

Figure 7:
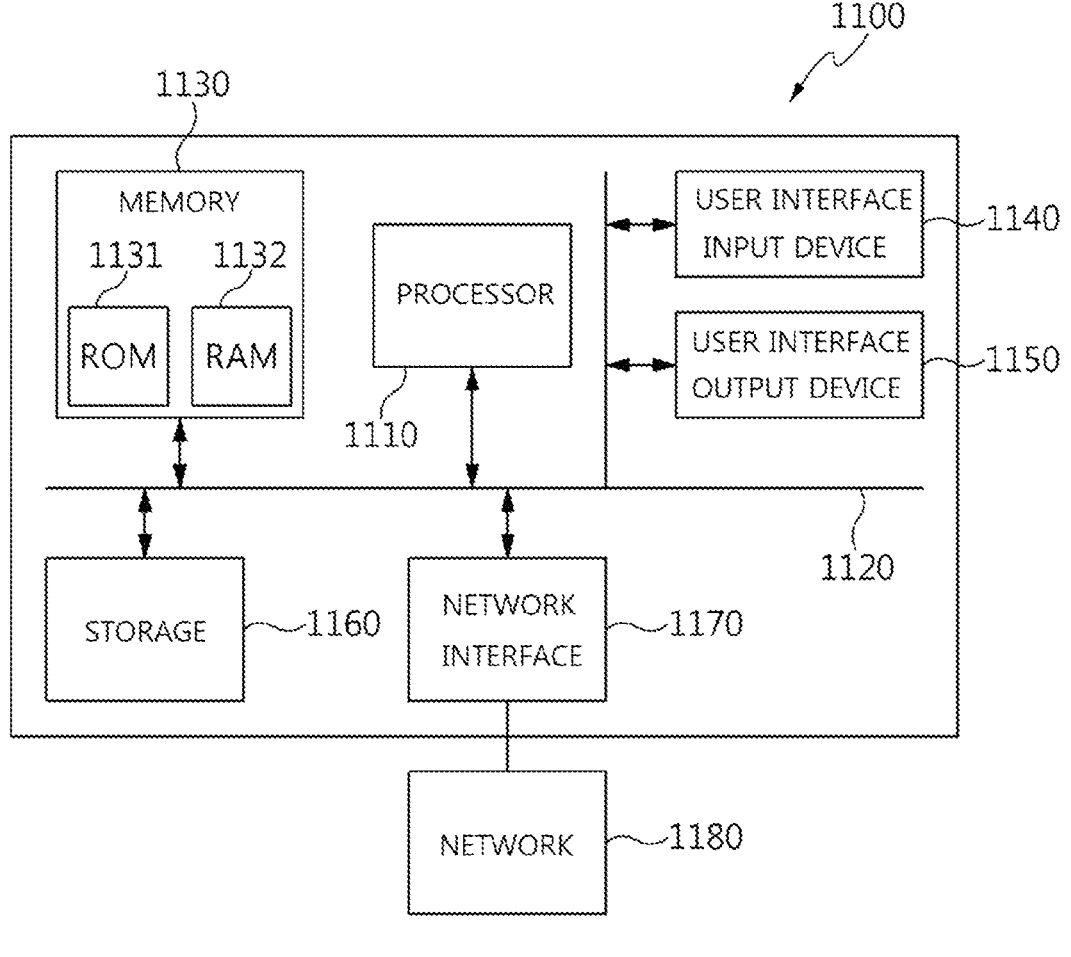
FIG. 7 is a view illustrating a computer system according to an embodiment of the present disclosure.

FIG. 7 is a view illustrating a computer system according to an embodiment of the present disclosure.

Referring to FIG. 7, the apparatus 100 for injecting control flow integrity security code based on a location according to an embodiment of the present disclosure may be implemented in a computer system 1100 including a computer-readable recording medium. As illustrated in FIG. 7, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for injecting control flow integrity security code based on a location according to an embodiment of the present disclosure includes one or more processors 1110 and executable memory 1130 for storing at least one program executed by the one or more processors 1110. The at least one program identifies an indirect function call in input program code, generates indirect function call location information by analyzing the identified indirect function call, and injects control flow integrity security code into the program code using the generated indirect function call location information.

Here, the at least one program may identify an indirect function call instruction and a target function of the indirect function call instruction by analyzing the identified indirect function call, and may identify a target function setting instruction based on the target function.

Here, the at least one program may calculate the block locations of the indirect function call instruction and the target function setting instruction in the program code.

Here, the at least one program may determine a control flow integrity identifier and a block location for injecting control flow integrity setting security code based on whether the block locations of the indirect function call instruction and the target function setting instruction are the same as each other in the program code based on the indirect function call instruction and the target function setting instruction.

Here, the at least one program may inject the control flow integrity setting security code at the block location of the indirect function call using a preset control flow integrity identifier when the block locations of the indirect function call instruction and the target function setting instruction are the same as each other in the program code.

Here, the at least one program may generate a new control flow integrity identifier and inject the control flow integrity setting security code at the block location of the target function setting instruction using the new control flow integrity identifier when the block locations of the indirect function call instruction and the target function setting instruction differ from each other in the program code.

Here, the at least one program may inject control flow integrity check code at the block location of the target function.

The present disclosure may improve the accuracy of detection of a control-flow hijacking attack on an indirect function call and reduce performance overhead.

As described above, the apparatus and method for injecting control flow integrity security code based on a location according to the present disclosure are not limitedly applied to the configurations and operations of the above-described embodiments, but all or some of the embodiments may be selectively combined and configured, so the embodiments may be modified in various ways.

What is claimed is:

1. An apparatus for injecting control flow integrity security code based on a location, comprising:

one or more processors; and executable memory for storing at least one program executed by the one or more processors, wherein the at least one program identifies an indirect function call in input program code, generates indirect function call location information by analyzing the identified indirect function call, and injects the control flow integrity security code into the program code using the generated indirect function call location information;

wherein the at least one program generates a new control flow integrity identifier and injects the control flow integrity setting security code at a block location of a target function setting instruction using the new control flow integrity identifier when block locations of an indirect function call instruction and the target function setting instruction differ from each other in the program code.

2. The apparatus of claim 1, wherein the at least one program identifies the indirect function call instruction and a target function of the indirect function call instruction by analyzing the identified indirect function call and identifies the target function setting instruction based on the target function.

3. The apparatus of claim 2, wherein the at least one program calculates the block locations of the indirect function call instruction and the target function setting instruction in the program code based on the indirect function call instruction and the target function setting instruction.

4. The apparatus of claim 3, wherein the at least one program determines a control flow integrity identifier and a block location for injecting control flow integrity setting security code based on whether the block locations of the indirect function call instruction and the target function setting instruction are identical to each other in the program code.

5. The apparatus of claim 4, wherein the at least one program injects the control flow integrity setting security code at a block location of the indirect function call using a preset control flow integrity identifier when the block locations of the indirect function call instruction and the target function setting instruction are identical to each other in the program code.

6. The apparatus of claim 1, wherein the at least one program injects control flow integrity check security code at a block location of a target function.

7. A method for injecting control flow integrity security code based on a location, performed by an apparatus for injecting the control flow integrity security code based on the location, comprising:

identifying an indirect function call in input program code;

generating indirect function call location information by analyzing the identified indirect function call; and injecting the control flow integrity security code into the program code using the generated indirect function call location information;

wherein injecting the control flow integrity security code comprises generating a new control flow integrity identifier and injecting the control flow integrity setting security code at a block location of a target function setting instruction using the new control flow integrity identifier when block locations of an indirect function call instruction and the target function setting instruction differ from each other in the program code.

8. The method of claim 7, wherein generating the indirect function call location information comprises identifying the indirect function call instruction and a target function of the indirect function call instruction by analyzing the identified indirect function call; and identifying the target function setting instruction based on the target function.

9. The method of claim 8, wherein generating the indirect function call location information comprises calculating the block locations of the indirect function call instruction and the target function setting instruction in the program code based on the indirect function call instruction and the target function setting instruction.

10. The method of claim 9, wherein injecting the control flow integrity security code comprises determining a control flow integrity identifier and a block location for injecting control flow integrity setting security code based on whether the block locations of the indirect function call instruction and the target function setting instruction are identical to each other in the program code.

11. The method of claim 10, wherein injecting the control flow integrity security code comprises injecting the control flow integrity setting security code at a block location of the indirect function call using a preset control flow integrity identifier when the block locations of the indirect function call instruction and the target function setting instruction are identical to each other in the program code.

12. The method of claim 7, wherein injecting the control flow integrity security code comprises injecting control flow integrity check security code at a block location of a target function.

* * * * *